United States Patent
Oroskar et al.

(10) Patent No.: US 9,820,201 B1
(45) Date of Patent: Nov. 14, 2017

(54) SYSTEMS AND METHODS FOR PERFORMING A HANDOVER BASED ON TARGET CONFIGURATION

(71) Applicant: Sprint Spectrum LP, Overland Park, KS (US)

(72) Inventors: Siddharth Oroskar, Overland Park, KS (US); Jasinder P. Singh, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 27 days.

(21) Appl. No.: 14/939,224

(22) Filed: Nov. 12, 2015

(51) Int. Cl.
| H04W 36/00 | (2009.01) |
|---|---|
| H04W 36/14 | (2009.01) |
| H04W 36/30 | (2009.01) |
| H04W 72/04 | (2009.01) |
| H04W 92/10 | (2009.01) |

(52) U.S. Cl.
CPC .......... H04W 36/14 (2013.01); H04W 36/30 (2013.01); H04W 72/0453 (2013.01); H04W 92/10 (2013.01)

(58) Field of Classification Search
CPC . H04W 36/14; H04W 36/30; H04W 72/0453; H04W 92/10
USPC ......................................... 455/436
See application file for complete search history.

(56) References Cited

U.S. PATENT DOCUMENTS

| 8,320,276 B1* | 11/2012 | Callender | H04L 5/001 370/236 |
|---|---|---|---|
| 2010/0232302 A1* | 9/2010 | Fukui | H04B 7/2621 370/252 |
| 2011/0207495 A1* | 8/2011 | Gerstenberger | H04W 72/0453 455/509 |
| 2011/0312326 A1* | 12/2011 | Kwon | H04W 36/0072 455/436 |
| 2013/0286902 A1 | 10/2013 | Chen et al. | |
| 2013/0308568 A1 | 11/2013 | Chen et al. | |
| 2014/0010200 A1* | 1/2014 | Kwon | H04W 36/0072 370/330 |
| 2015/0319761 A1* | 11/2015 | Nagata | H04W 72/048 370/329 |
| 2016/0095082 A1* | 3/2016 | Lee | H04W 64/00 455/456.1 |
| 2016/0143035 A1* | 5/2016 | Xue | H04L 5/001 370/329 |

* cited by examiner

*Primary Examiner* — Timothy Pham

(57) ABSTRACT

Systems and methods are described for performing a handover based on a target configuration. Signal information may be received, from a wireless device at a first access node, comprising a signal level for a received signal at the wireless device for a target frequency band, wherein the wireless device and the access node communicate over a source frequency band using a first subframe configuration. A second subframe configuration used by the target carrier to communicate with wireless devices may be determined. A traffic metric for the wireless device may be compared to the second subframe configuration. And, the wireless device may be instructed to perform a handover from the source frequency band to the target frequency band when the signal level meets a signal level criteria and the second subframe configuration satisfies the traffic metric.

20 Claims, 9 Drawing Sheets

SYSTEMS AND METHODS FOR PERFORMING A HANDOVER BASED ON TARGET CONFIGURATION

TECHNICAL BACKGROUND

Telecommunication systems, such as cellular networks or other wireless networks, rely on multiple network elements to provide reliable services. For example, a plurality of access points (e.g., access nodes) may be located in a given geographic space to provide reliable coverage over the space. In addition, wireless spectrum used to transmit data can be broken up into a multiple frequencies bands such that multiple wireless devices can be serviced. As such, handovers to a from various access points or to and from various frequency bands may be common in a given system. However, in some instances, a wireless device can be underserved after performing a handover based on a new access point and/or new frequency band used to access the network. A system that effectively considers the conditions for a wireless device and the conditions for possible handover targets (e.g., access point targets and/or frequency band targets) can provide enhanced service to users of the system.

Overview

Systems and methods are described for performing a handover based on target configuration. Signal information may be received, from a wireless device at a first access node, comprising a signal level for a received signal at the wireless device for a target frequency band, wherein the wireless device and the access node communicate over a source frequency band using a first subframe configuration. A second subframe configuration used by the target carrier to communicate with wireless devices may be determined. The first subframe configuration and second subframe configuration may be compared. And, the wireless device may be instructed to perform a handover from the source frequency band to the target frequency band when the signal level meets a signal level criteria based on the comparison.

Systems and methods are described for performing a handover based on target configuration. Signal information may be received, from a wireless device at a first access node, comprising a signal level for a received signal at the wireless device for a target frequency band, wherein the wireless device and the access node communicate over a source frequency band using a first subframe configuration. A second subframe configuration used by the target carrier to communicate with wireless devices may be determined. A traffic metric for the wireless device may be compared to the second subframe configuration. And, the wireless device may be instructed to perform a handover from the source frequency band to the target frequency band when the signal level meets a signal level criteria and the second subframe configuration satisfies the traffic metric.

Systems and methods are also described for performing a handover based on target configuration. Signal information may be received, from a wireless device at a first access node, comprising a first signal level for a received signal at the wireless device for a source frequency band, a second signal level for a received signal at the wireless device for a first target frequency band, and a third signal level for a received signal at the wireless device for a second target frequency band, wherein the wireless device and the access node communicate over the source frequency band using a first subframe configuration. A second subframe configuration used by the first target frequency band to communicate with wireless devices and a third subframe configuration used by the second target frequency band to communicate with wireless devices may be determined. A traffic metric for the wireless device may be compared to the second subframe configuration and the third subframe configuration. One of the source frequency band, the first target frequency band, and the second target frequency band may be selected for the wireless device based on the comparison. And, the wireless device may be instructed to perform a handover from the source frequency band to the selected frequency band when the first target frequency band or second target frequency band is selected.

DETAILED DESCRIPTION

Systems and methods are described for performing a handover based on target configuration. In some instances, handovers to target access nodes or target frequency bands may result in a wireless device being underserved based on conditions for the wireless devices and/or access node. For instance, where the wireless device is using an application that relies on relatively high downlink data rates (e.g., video streaming, and the like), the wireless device may be underserved if handed over to an access node or frequency band that is unlikely to provide such rates. In this example, such a circumstance may occur when a wireless device is handed over from a first frequency band or access node that communicates using a subframe structure with a first number of downlink subframes to a second frequency band or access node that communicates using a subframe structure with a second number of downlink subframes, where the second number is less than the first number.

Thus, prior to making a handover decision, a traffic metric for the wireless device (e.g., QCI) may be compared to the subframe configuration of the target frequency band or access node or the current subframe configuration used to communicate with the wireless device may be compared to the subframe configuration of the target frequency band. The wireless device may then be handed over to the second subframe configuration based on the comparison. These additional considerations for a handover may mitigate against a wireless device being underserved.

Figure 1:
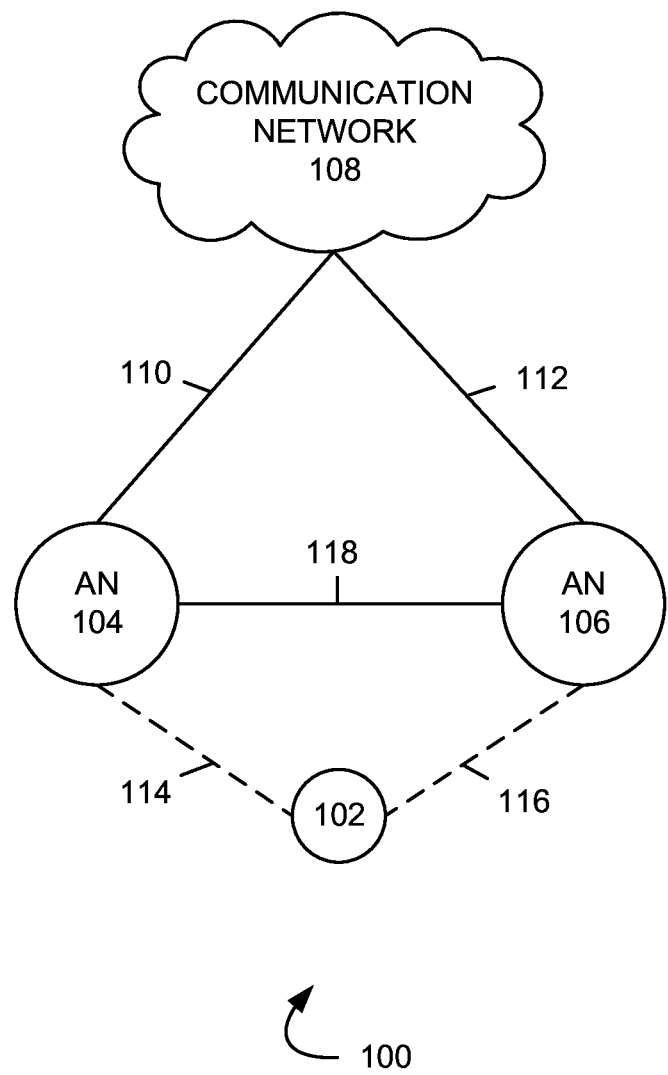
FIG. 1 illustrates an exemplary communication system to perform a handover based on target configuration.

FIG. 1 illustrates an exemplary communication system 100 to perform a handover based on target configuration comprising wireless device 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with the depicted access nodes, any number of wireless devices can be implemented.

Access nodes 104 and 106 are network nodes capable of providing wireless communications to wireless device 102, and can be, for example, a base transceiver station, a radio base station, and an eNodeB device. Access nodes 104 and 106 may communicate with communication network 108 over communication links 110 and 112, respectively, and may communicate with each other over communication link 118. Although only two access nodes are illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 104 may establish communication with wireless device 102 such that access node 104 provides the wireless devices access to a communication network (e.g., communication network 108). In an embodiment, system 100 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, wireless device 102 may access communication network 108 via access node 104, and may also receive signals from access nodes 104 and 106. For example, the received signals may be based on reference signals transmitted from each access node. Based on the received signals from the access nodes, an event may be triggered at wireless device 102 (e.g., reporting event) such that wireless device 102 sends signal information to access node 104. For example, the signal information may comprise a received signal level (e.g., reference signal received power, RSRP) for signals from each access node. In some instances, a handover decision may be determined based on the signal information.

In other embodiments, access node 104 may transmit signals on a plurality of frequency bands. Accordingly wireless device 102 may access communication network 108 via access node 104 communicating over a first frequency band, and may also receive signals from access node 104 on a first frequency band and a second frequency band. For example, the received signals may be based on reference signals transmitted over each frequency band. Based on the received signals from access node 104, an event may be triggered at wireless device 102 (e.g., reporting event) such that wireless device 102 sends signal information to access node 104. For example, the signal information may comprise a received signal level (e.g., reference signal received power, RSRP) for received signals over each frequency band. In some instances, a handover decision may be determined based on the signal information.

However, a handover decision based on received signal levels may fail to account for communication configurations used by the target access node and/or target frequency band. For instance, wireless device 102 may be running an application that utilizes a relatively high downlink data rate (e.g., streaming video) or some other application with specific quality of service (QoS) requirements. Accordingly, a system that considers the QoS requirements for a wireless device and the communication configuration for a target access node and/or target frequency band can provide enhanced services to users of the system.

Figure 2A:
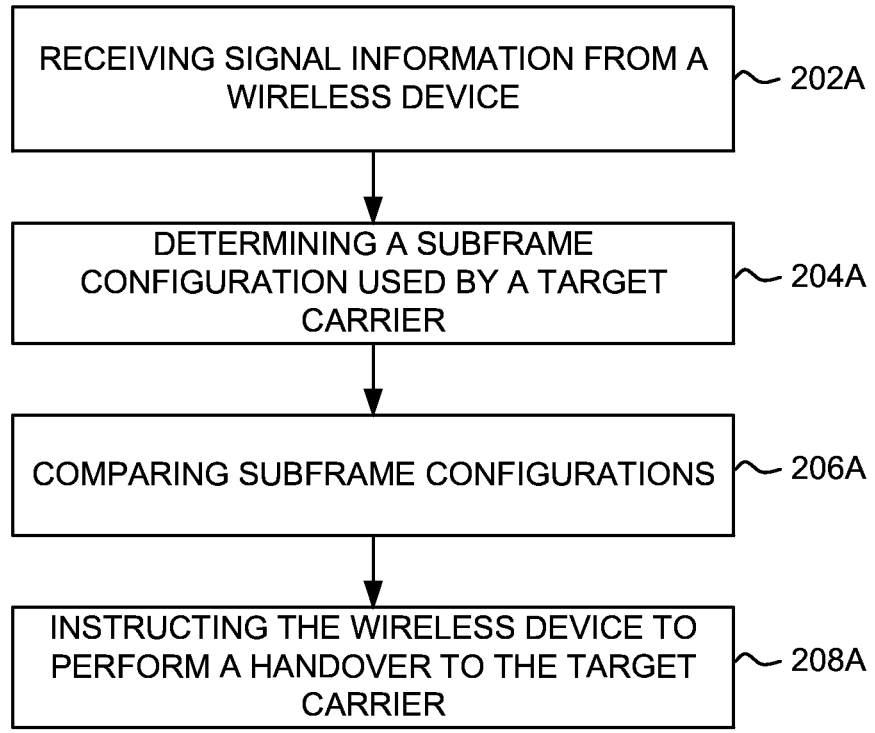
FIGS. 2A and 2B illustrate exemplary methods for performing a handover based on target configuration.

FIG. 2A illustrates an exemplary method for performing a handover based on target configuration according to an embodiment. The method will be discussed with reference to the exemplary communication system 100 illustrated in FIG. 1, however, the method can be implemented with any suitable communication system.

Referring to FIG. 2A, at step 202A, signal information may be received from a wireless device at a first access node comprising a signal level for a received signal at the wireless device for a target frequency band, wherein the wireless device and the access node communicate over a source frequency band using a first subframe configuration. For example, access node 104 and wireless device 102 may communicate over a source frequency band using a first subframe configuration. For instance, communication between access node 104 and wireless device 102 may be coordinated according to the first subframe configuration that comprises a mix of uplink and downlink subframes.

In an embodiment, signal information may be received at access node 104 from wireless device 102 (e.g., in response to a reporting event being triggered as wireless device 102). The signal information may comprise a received signal level for a signal received at wireless device 102 from access node 106 over a target frequency band. For example, the signal level may comprise a RSRP for a signal received from access node 106 over the target frequency band.

In another embodiment, the received signal over the target frequency band may be received from access node 104. For example, access node 104 may communicate with wireless devices using a plurality of frequency bands, and at least the source frequency band and the target frequency band. Here, the signal information may comprise a received signal level for a signal received at wireless device 102 from access node 104 over the target frequency band.

At step 204A, a second subframe configuration used by the target frequency band to communicate with wireless devices may be determined. For example, the subframe configuration used to communicate over the target frequency band (e.g., by either access node 104 or access node 106) may be determined.

At step 206A, the first subframe configuration may be compared to the second subframe configuration. For example, the mix of subframes for the first subframe configuration may be compared to the mix of subframes for the second subframe configuration.

At step 208A, the wireless device may be instructed to perform a handover from the source frequency band to the target frequency band based on the subframe configuration comparison when the signal level meets a signal level criteria. For example, wireless device 102 may be instructed to perform a handover from the source frequency band to the target frequency band (e.g., used by either access node 104 or 106) when the received signal level for the signal received at wireless device 102 over the target frequency band meets a signal level criteria and based on the comparison between the first subframe configuration and the second subframe configuration.

In an embodiment, wireless device 102 may be instructed to perform an inter-access node handover or an intra-access node handover. For example, when the received signals corresponding to the source frequency band and the target frequency band are both transmitted by access node 104, wireless device 102 may be instructed to perform and intra-access node handover. When the received signals corresponding to the source frequency band and the target frequency band are transmitted by access node 104 and access node 106, respectively, wireless device 102 may be instructed to perform and inter-access node handover.

Figure 2B:
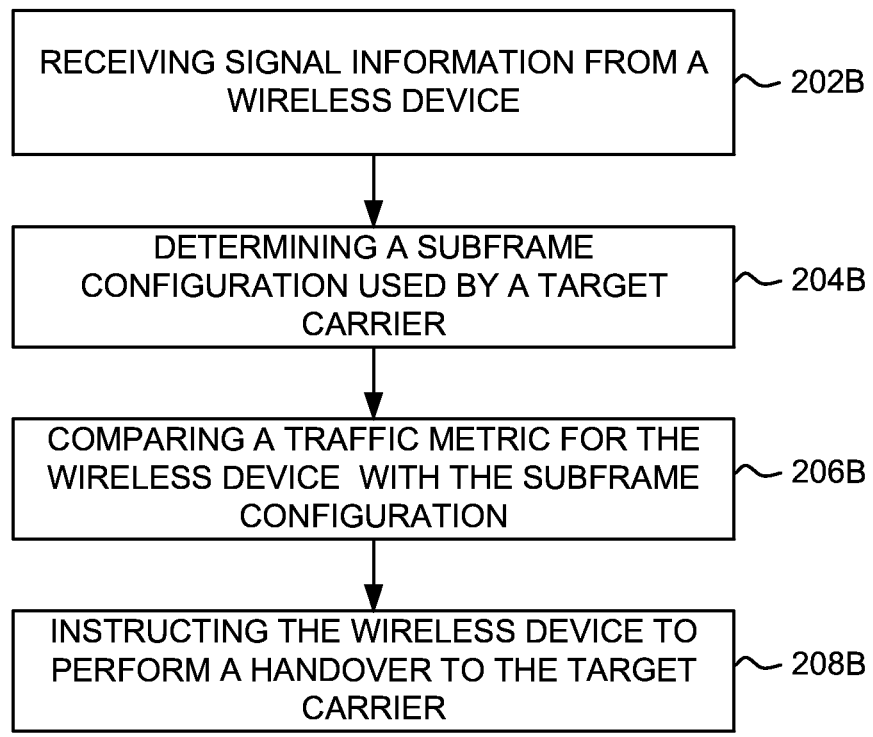

FIG. 2B illustrates an exemplary method for performing a handover based on target configuration according to an embodiment. The method will be discussed with reference to the exemplary communication system 100 illustrated in FIG. 1, however, the method can be implemented with any suitable communication system.

Referring to FIG. 2B, at step 202B, signal information may be received from a wireless device at a first access node comprising a signal level for a received signal at the wireless device for a target frequency band, wherein the wireless device and the access node communicate over a source frequency band using a first subframe configuration. For example, access node 104 and wireless device 102 may communicate over a source frequency band using a first subframe configuration. For instance, communication between access node 104 and wireless device 102 may be coordinated according to the first subframe configuration that comprises a mix of uplink and downlink subframes.

In an embodiment, signal information may be received at access node 104 from wireless device 102 (e.g., in response to a reporting event being triggered as wireless device 102). The signal information may comprise a received signal level for a signal received at wireless device 102 from access node 106 over a target frequency band. For example, the signal level may comprise a RSRP for a signal received from access node 106 over the target frequency band.

In another embodiment, the received signal over the target frequency band may be received from access node 104. For example, access node 104 may communicate with wireless devices using a plurality of frequency bands, and at least the source frequency band and the target frequency band. Here, the signal information may comprise a received signal level for a signal received at wireless device 102 from access node 104 over the target frequency band.

At step 204B, a second subframe configuration used by the target frequency band to communicate with wireless devices may be determined. For example, the subframe configuration used to communicate over the target frequency band (e.g., by either access node 104 or access node 106) may be determined.

At step 206B, a traffic metric for the wireless device may be compared to the second subframe configuration. For example, a traffic metric, such as the QoS Class Identifier (QCI), for wireless device 102 may be compared to the determined second subframe configuration.

At step 208B, the wireless device may be instructed to perform a handover from the source frequency band to the target frequency band when the signal level meets a signal level criteria and the second subframe configuration satisfies the traffic metric. For example, wireless device 102 may be instructed to perform a handover from the source frequency band to the target frequency band (e.g., used by either access node 104 or 106) when the received signal level for the signal received at wireless device 102 over the target frequency band meets a signal level criteria and when the second subframe configuration satisfies the traffic metric for wireless device 102.

In an embodiment, wireless device 102 may be instructed to perform an inter-access node handover or an intra-access node handover. For example, when the received signals corresponding to the source frequency band and the target frequency band are both transmitted by access node 104, wireless device 102 may be instructed to perform and intra-access node handover. When the received signals corresponding to the source frequency band and the target frequency band are transmitted by access node 104 and access node 106, respectively, wireless device 102 may be instructed to perform and inter-access node handover.

Figure 3:
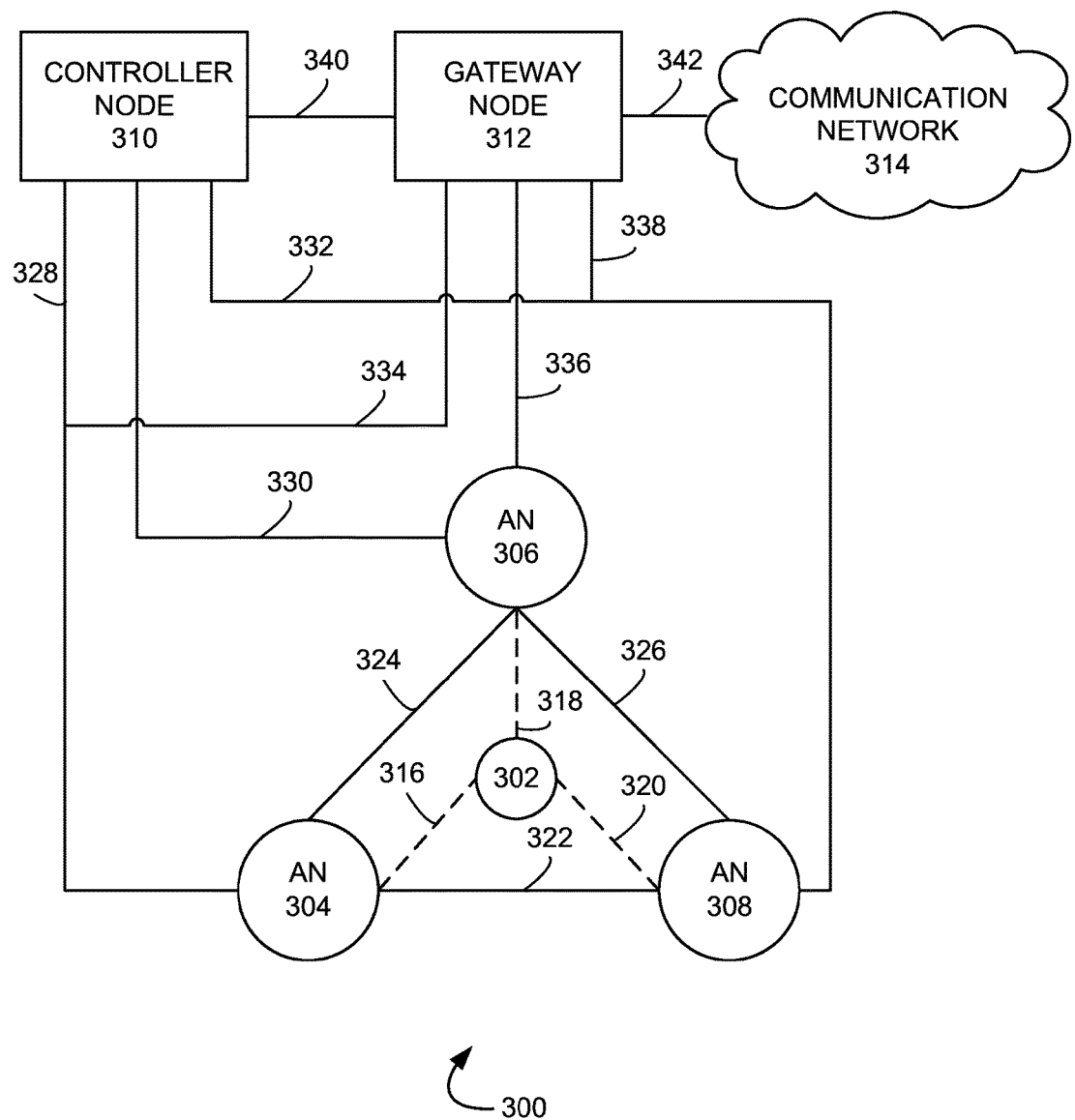
FIG. 3 illustrates another exemplary communication system to perform a handover based on target configuration.

FIG. 3 illustrates another exemplary communication system 300 to perform a handover based on target configuration. Communication system 300 may comprise wireless device 302, access nodes 304, 306, and 308, controller node 310, gateway node 312, communication network 314, and communication links 318, 320, 322, 324, 326, 328, 330, 332, 334, 336, 338, 340, and 342. Other network elements may be present in the communication system 300 to facilitate communication but are omitted for clarity, such as base stations, base station controllers, gateways, mobile switching centers, dispatch application processors, and location registers such as a home location register or visitor location register.

Wireless device 302 can be any device configured to communicate over communication system 300 using a wireless communication link. For example, wireless device 302 can include a cell phone, a smart phone, a computing platform such as a laptop, palmtop, or a tablet, a personal digital assistant, or an internet access device, and combinations thereof.

Access nodes 304, 306, and 308 are a network node capable of providing wireless communications to wireless device 302, and can be, for example, a base transceiver station, a radio base station, or an eNodeB device. In an embodiment, access node 304 can comprise a serving access node for wireless device 302. Access node 304, 306, and 308 may communicate with controller node 310 over communication link 328, 330, and 332, respectively, and with gateway node 312 over communication links 334, 336, and 338, respectively. Access nodes 304, 306, and 308 may communicate with one another over communication links 322, 324, and 326.

Controller node 310 can be any network node configured to manage services within system 300. Controller node 310 may provide other control and management functions for system 300. The controller node 310 can be a single device having various functions or a plurality of devices having differing functions. For example, controller node 310 can include at least one of a multi-cell/multicast coordination entity (MCE), a mobility management entity (MME), a radio network controller (RNC), a mobile switching center (MSC), and a combination thereof.

Controller node 310 can comprise a processor and associated circuitry to execute or direct the execution of computer-readable instructions to obtain information. Controller node 310 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 310 can receive instructions and other input at a user interface. Controller node 310 can comprise a processor and associated circuitry to execute or direct the execution of computer-readable instructions to obtain information.

Gateway node 312 is a network element which can comprise a processor and associated circuitry to execute or direct the execution of computer-readable instructions. Gateway node 312 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 312 can provide instructions to access nodes 304, 306, and 308 related to channel selection in communications with wireless device 302. For example, gateway node 312 can comprise at least one of a serving gateway (SGW), a packet data network gateway (PDNGW), a cellular gateway (CGW), and a combination thereof.

Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 318, 320, 322, 324, 326, 328, 330, 332, 334, 336, 338, 340, and 342 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 304, 306, and 308, controller node 310, gateway node 312, and communication network 314 which are omitted for clarity, including additional processing nodes, routers, gateways, and physical and/or wireless data links for carrying data among the various network elements. In an embodiment, any of controller node 310, gateway node 312, and one or more modules of access nodes 304, 306, and 308, may perform all or parts of the methods of FIGS. 2, 4, and 5.

In operation, access node 304 may establish communication with wireless device 302 such that access node 304 provides the wireless devices access to a communication network (e.g., communication network 108). In an embodiment, system 300 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, wireless device 302 may access communication network 314 via access node 304, and may also receive signals from access nodes 306 and 308. For example, the received signals may be based on reference signals transmitted from each access node. Based on the received signals from the access nodes, an event may be triggered at wireless device 302 (e.g., LTE reporting event) such that wireless device 302 sends signal information to access node 304. For example, the signal information may comprise a received signal level (e.g., RSRP) for signals from each access node. In some instances, a handover decision may be determined based on the signal information.

In other embodiments, access node 304 may transmit signals on a plurality of frequency bands. Accordingly wireless device 302 may access communication network 314 via access node 304 communicating over a first frequency band, and may also receive signals from access node 304 on a first frequency band and a second frequency band. For example, the received signals may be based on reference signals transmitted over each frequency band. Based on the received signals from access node 304, an event may be triggered at wireless device 302 (e.g., LTE reporting event) such that wireless device 302 sends signal information to access node 304. For example, the signal information may comprise a received signal level (e.g., RSRP) for received signals over each frequency band. In some instances, a handover decision may be determined based on the signal information.

However, a handover decision based on received signal levels may fail to account for communication configurations used by the target access node and/or target frequency band. For instance, wireless device 302 may be running an application that utilizes a relatively high downlink data rate (e.g., streaming video) or some other application with specific quality of service (QoS) requirements. Accordingly, a system that considers the QoS requirements for a wireless device and the communication configuration for a target access node and/or target frequency band can provide enhanced services to users of the system.

Figure 4:
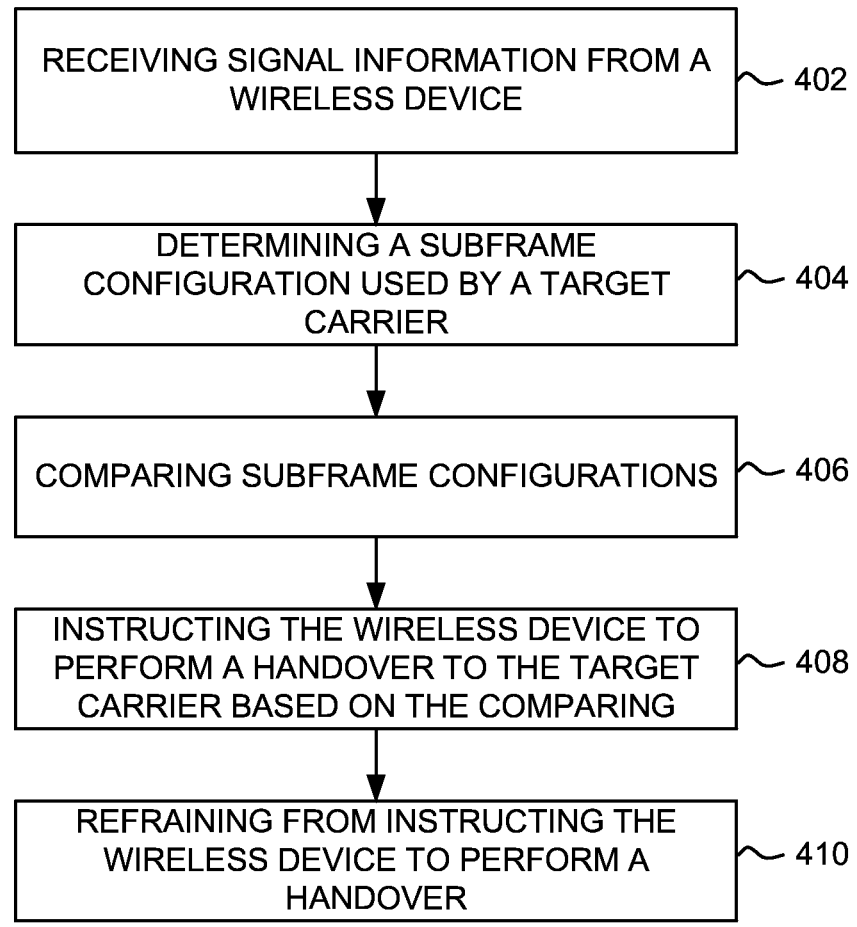
FIG. 4 illustrates another exemplary method for performing a handover based on target configuration.

FIG. 4 illustrates an exemplary method for performing a handover based on target configuration according to an embodiment. The method will be discussed with reference to the exemplary communication system 300 illustrated in FIG. 3, however, the method can be implemented with any suitable communication system.

Referring to FIG. 4, at step 402, signal information may be received from a wireless device at a first access node comprising a signal level for a received signal at the wireless device for a target frequency band, wherein the wireless device and the access node communicate over a source frequency band using a first subframe configuration. For example, access node 304 and wireless device 302 may communicate over a source frequency band using a first subframe configuration. For instance, communication between access node 304 and wireless device 302 may be coordinated according to the first subframe configuration that comprises a mix of uplink and downlink subframes.

For example, in a time division duplex (TDD) system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency at different times. In an embodiment, a frame structure may comprise uplink subframes and/or downlink subframes, where each frame structure may comprise a different mix of subframes.

Figure 7:
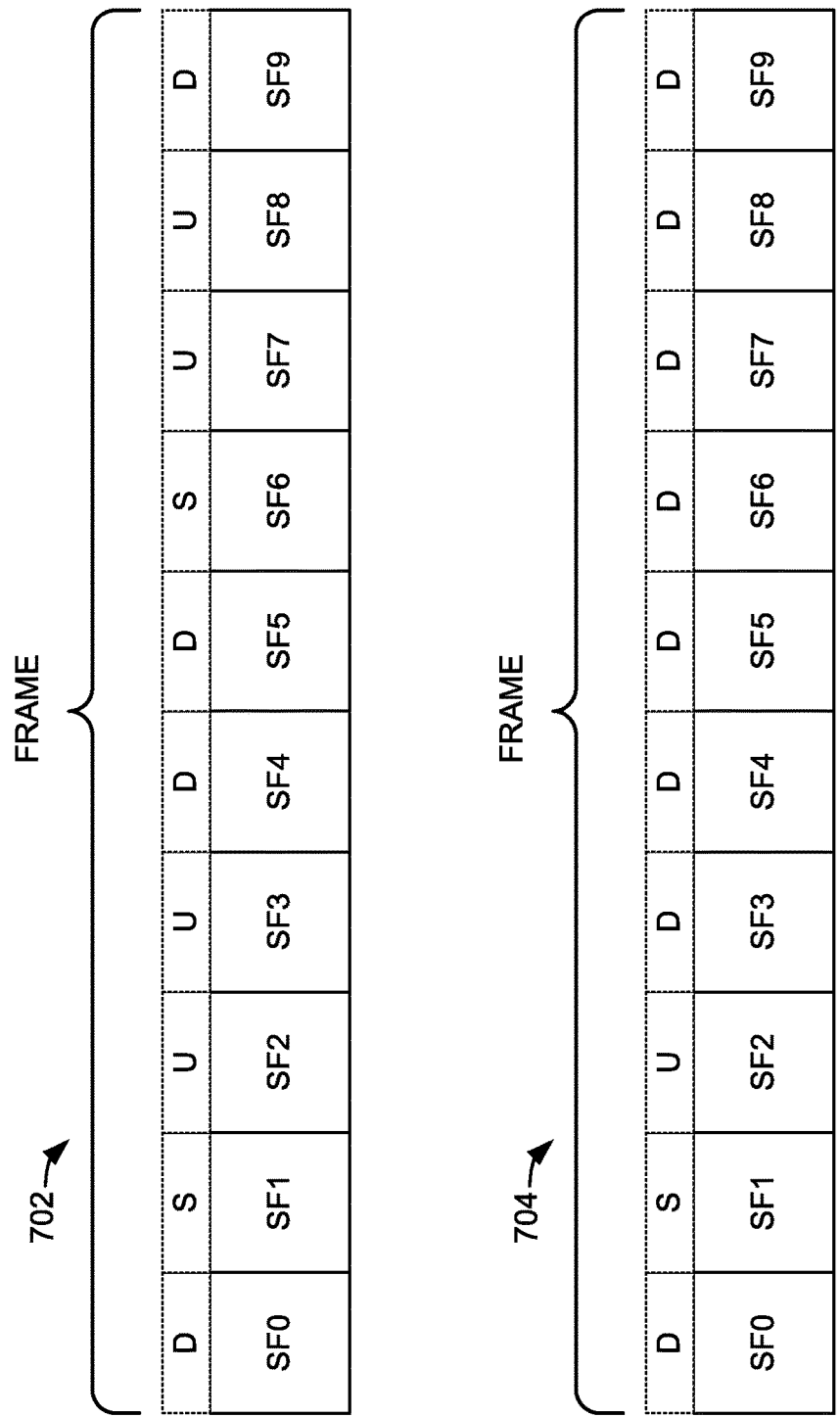
FIG. 7 illustrates subframe configurations used for wireless communication.

FIG. 7 illustrates sample subframes structures in accordance with an embodiment. For example, a frame structure 702 may comprise 10 subframes, where the order of subframes may comprise downlink, special, uplink, uplink, downlink, downlink, special, uplink, uplink, and downlink. A frame structure 704 may comprise 10 subframes, where the order of subframes may comprise downlink, special, uplink, downlink, downlink, downlink, downlink, downlink, downlink, and downlink. Other frame structure may comprise various other mixes of special, downlink, and uplink configurations. In an embodiment, access node 304 may communicate with wireless device 302 based on a first subframe configuration.

In an embodiment, signal information may be received at access node 304 from wireless device 302 (e.g., in response to a reporting event being triggered as wireless device 302). The reporting event may comprise a LTE measurement reporting event that is triggered based on comparisons involving one or more received signal levels, one or more hysteresis, and/or one or more thresholds. Based on a triggered reporting event, a wireless device may transmit measurement reports comprising signal information to a serving access node.

In an embodiment, the signal information may comprise a received signal level for a signal received at wireless device 302 from access node 306 or access node 308 over a target frequency band. In other examples, the signal information may comprise received signal levels at wireless device 302 from access nodes 304, 306, and 308, where the received signals may be transmitted over one of more frequency bands. In an embodiment, the signal level may comprise a Received Signal Strength Indicator, (RSSI), Reference Signal Received Quality (RSRQ), RSRP, or any other suitable signal level.

In another embodiment, the received signal over the target frequency band may be received from access node 304. For example, access node 304 may communicate with wireless devices using a plurality of frequency bands, and at least the source frequency band and the target frequency band. Here, the signal information may comprise a received signal level for a signal received at wireless device 302 from access node 304 over the target frequency band.

At step 404, a second subframe configuration used over the target frequency band to communicate with wireless devices may be determined. For example, the subframe configuration used to communicate over the target frequency band (e.g., by one of access node 304, 306, or 308) may be determined. In this example, the mix of uplink, downlink, and/or special subframes for the second subframe configuration used over the target frequency band may be determined.

In an embodiment where one of access nodes 306 or 308 transmits the signal over the target frequency band received at wireless device 302, access node 304 may receive second subframe configuration information from the transmitting access node. For example, over an X2 connection, the plurality of access nodes may share configuration information, such as subframe configurations for various frequency bands used for communication.

At step 406, the first subframe configuration may be compared to the second subframe configuration. For example, the mix of subframes for the first subframe configuration may be compared to the mix of subframes for the second subframe configuration.

In an embodiment, comparing the subframe configurations may comprise determining whether the first subframe configuration matches the second subframe configuration.

For example, the first subframe configuration may match the second subframe configuration when the configurations comprise the same order of subframes. For example, when implementing a set of potential subframe configurations (e.g., 6, as in an LTE implementation), the order of subframes (e.g., order of uplink, downlink, and special subframes) for each subframe configuration may be compared to determine whether the two configurations match. In another example, a subframe configuration indicator may indicate the mix and/or order of subframes within the configuration. In this example, the indicators for the first subframe configuration and second subframe configuration may be compared to determine if the indicators match.

In an embodiment, comparing the subframe configurations may comprise determining whether the first subframe configuration and the second subframe configuration are part of the same group of subframe configurations. For example, when implementing a set of potential subframe configurations (e.g., 6, as in an LTE implementation), the set of subframe configurations may be grouped based on characteristics for the comprised subframes. For example, the set of subframe configurations may be grouped into multiple groups based on ranges for a number of downlink subframes comprised in each configuration (e.g., a first group having 6-8 downlink subframes, second group having 4-5 downlink subframes, third group having 2-3 downlink subframes, and the like). Similarly, the subframe configurations may be grouped based on ranges for a number of uplink subframes comprised in the configuration.

In another example, a subframe configuration indicator may indicate the mix and/or order of subframes within the configuration. In this example, subframe configuration indicators may be grouped based on properties for the indicated subframe configuration, and the indicators for the first subframe configuration and second subframe configuration may be compared to determine if they are part of the same group of subframe configurations.

In an embodiment, the first subframe configuration and second subframe configuration may be determined to be similar when they are part of the same group of subframe configurations (e.g., when the number of downlink subframes each configuration comprises falls into a predetermined range). In another example, the first subframe configuration and second subframe configuration may be determined to be similar when the difference in downlink subframes that each configuration comprises is less than or equal to a threshold difference (e.g., 2 downlink subframes). Similarity between subframe configurations may also be determined based on number of uplink subframes, based subframe configuration indicators, and in any other suitable manner.

At step 408, the wireless device may be instructed to perform a handover from the source frequency band to the target frequency band when the signal level meets a signal level criteria based on the comparison. For example, wireless device 302 may be instructed to perform a handover from the source frequency band to the target frequency band (e.g., used by one of access nodes 304, 306, or 308) when the received signal level for the signal received at wireless device 302 over the target frequency band meets a signal level criteria and when the first subframe configuration is determined to match the second subframe configuration based on the comparison.

In an embodiment, wireless device 302 may be instructed to perform a handover from the source frequency band to the target frequency band (e.g., used by one of access nodes 304, 306, or 308) when the received signal level for the signal received at wireless device 302 over the target frequency band meets a signal level criteria and when the first subframe configuration and second subframe configuration are determined to be part of the same group of subframe configurations. For example, a set of potential subframe configurations may be grouped based on, for example, ranges for a number of downlink subframes comprised in each configuration or number of uplink subframes comprised in each configuration.

In an embodiment, the received signal level for the signal received at wireless device 302 may meet the signal level criteria based on comparisons involving one or more a hysteresis, a threshold, and received signal level for other signals received at wireless device 302 (e.g., a received signal level over the source frequency band). For instance, based on an inequality comprising a plurality of these listed values, it may be determined that the received signal level over the target frequency band meets the signal level criteria.

In an embodiment, wireless device 302 may be instructed to perform an inter-access node handover or an intra-access node handover. For example, when the received signals corresponding to the source frequency band and the target frequency band are both transmitted by access node 304, wireless device 302 may be instructed to perform and intra-access node handover. When the received signals corresponding to the source frequency band and the target frequency band are transmitted by access node 304 and one of access nodes 306 and 308, respectively, wireless device 102 may be instructed to perform and inter-access node handover.

At step 412, the access node may refrain from instructing the wireless device to perform a handover from the source frequency band to the target frequency band when the signal level fails to meet a signal level criteria or based on the comparison of subframe configurations. For example, based on the comparisons described, access node 304 may refrain from instructing wireless device 302 to perform a handover from the source frequency band to the target frequency band when the signal level fails to meet a signal level criteria or the first and second subframe configurations do not match or are not part of the same group of subframe configurations. In this example, based on the received signal level for the source frequency band at wireless device 302, access node 304 may adjust one or more transmissions to the wireless device. For example, access node 304 may enable beamforming such that a beam formed signal is transmitted to the wireless device to mitigate against poor signal conditions and also meet a traffic metric of the wireless device.

Figure 5:
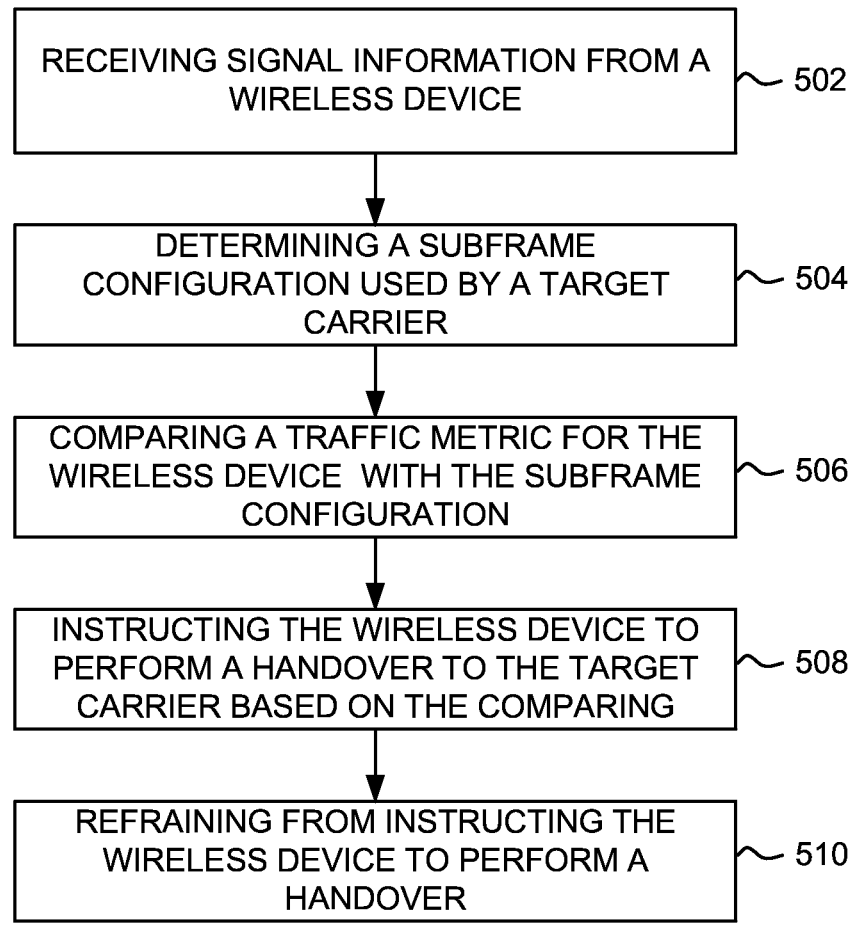
FIG. 5 illustrates another exemplary method for performing a handover based on target configuration.

FIG. 5 illustrates an exemplary method for performing a handover based on target configuration according to an embodiment. The method will be discussed with reference to the exemplary communication system 300 illustrated in FIG. 3, however, the method can be implemented with any suitable communication system.

Referring to FIG. 5, at step 502, signal information may be received from a wireless device at a first access node comprising a signal level for a received signal at the wireless device for a target frequency band, wherein the wireless device and the access node communicate over a source frequency band using a first subframe configuration. For example, access node 304 and wireless device 302 may communicate over a source frequency band using a first subframe configuration. For instance, communication between access node 304 and wireless device 302 may be coordinated according to the first subframe configuration that comprises a mix of uplink and downlink subframes.

For example, in a time division duplex (TDD) system, a frame may comprise a number of subframes (e.g. Transmission Time Intervals, TTIs) that include a mix of uplink subframes and downlink subframes. In some embodiments, a special subframe may also be used, for instance, as a guard between an uplink subframe and a downlink subframe or for any other suitable purpose. When using a TDD structure, an uplink subframe and a downlink subframe may be transmitted over the same frequency at different times. In an embodiment, a frame structure may comprise uplink subframes and/or downlink subframes, where each frame structure may comprise a different mix of subframes.

FIG. 7 illustrates sample subframes structures in accordance with an embodiment. For example, a frame structure 702 may comprise 10 subframes, where the order of subframes may comprise downlink, special, uplink, uplink, downlink, downlink, special, uplink, uplink, and downlink. A frame structure 704 may comprise 10 subframes, where the order of subframes may comprise downlink, special, uplink, downlink, downlink, downlink, downlink, downlink, downlink, and downlink. Other frame structure may comprise various other mixes of special, downlink, and uplink configurations. In an embodiment, access node 304 may communicate with wireless device 302 based on a first subframe configuration.

In an embodiment, signal information may be received at access node 304 from wireless device 302 (e.g., in response to a reporting event being triggered as wireless device 302). The reporting event may comprise a LTE measurement reporting event that is triggered based on comparisons involving one or more received signal levels, one or more hysteresis, and/or one or more thresholds. Based on a triggered reporting event, a wireless device may transmit measurement reports comprising signal information to a serving access node.

In an embodiment, the signal information may comprise a received signal level for a signal received at wireless device 302 from access node 306 or access node 308 over a target frequency band. In other examples, the signal information may comprise received signal levels at wireless device 302 from access nodes 304, 306, and 308, where the received signals may be transmitted over one of more frequency bands. In an embodiment, the signal level may comprise a Received Signal Strength Indicator, (RSSI), Reference Signal Received Quality (RSRQ), RSRP, or any other suitable signal level.

In another embodiment, the received signal over the target frequency band may be received from access node 304. For example, access node 304 may communicate with wireless devices using a plurality of frequency bands, and at least the source frequency band and the target frequency band. Here, the signal information may comprise a received signal level for a signal received at wireless device 302 from access node 304 over the target frequency band.

At step 504, a second subframe configuration used over the target frequency band to communicate with wireless devices may be determined. For example, the subframe configuration used to communicate over the target frequency band (e.g., by one of access node 304, 306, or 308) may be determined. In this example, the mix of uplink, downlink, and/or special subframes for the second subframe configuration used over the target frequency band may be determined.

In an embodiment where one of access nodes 306 or 308 transmits the signal over the target frequency band received at wireless device 302, access node 304 may receive second subframe configuration information from the transmitting access node. For example, over an X2 connection, the plurality of access nodes may share configuration information, such as subframe configurations for various frequency bands used for communication.

At step 506, a traffic metric for the wireless device may be compared to the second subframe configuration. For example, a traffic metric, such as the QoS Class Identified (QCI), for wireless device 102 may be compared to the determined second subframe configuration.

In an embodiment, comparing the traffic metric for wireless device 302 with the second subframe configuration may comprise comparing a QCI for wireless device 302 with a number of downlink subframes for the second subframe configuration. In this example, the second subframe configuration may satisfy the QCI for wireless device 302 when a number of downlink subframes for the second subframe configuration meets a threshold downlink number. In an embodiment, the threshold downlink number may be associated with a particular QCI. For example, the QCI for wireless device 302 may comprise a value (e.g., between 1 and 9 for LTE implementations) and based on the QCI value, and the QoS requirements associated with the value, threshold numbers of downlink subframes may be associated with particular QCI values. Thus, the second subframe configuration may satisfy the QCI for wireless device 302 when a number of downlink subframes for the second subframe configuration is greater than (or equal to) a threshold downlink number associated with the particular QCI.

In another embodiment, comparing the traffic metric for wireless device 302 with the second subframe configuration may comprise comparing a downlink data rate for wireless device 302 with a number of downlink subframes for the second subframe configuration. In this example, the second subframe configuration may satisfy the downlink data rate for wireless device 302 when a number of downlink subframes for the second subframe configuration meets a threshold downlink number. In an embodiment, the threshold downlink number may be associated with a particular downlink data rate, where the downlink data rate and threshold downlink number are directly related to one another. Thus, the second subframe configuration may satisfy the downlink data rate for wireless device 302 when a number of downlink subframes for the second subframe configuration is greater than (or equal to) a threshold downlink number associated with the particular downlink data rate.

In another embodiment, the second subframe configuration may satisfy the traffic metric for wireless device 302 when a number of downlink subframes for the second subframe configuration meets threshold downlink number corresponding to the traffic metric (e.g., threshold associated with the QCI or downlink data rate for wireless device 302), and when the number of downlink subframes for the second subframe configuration is greater than the number of downlink subframes for the first subframe configuration. In addition, in some embodiments, the traffic metric (e.g., QCI, downlink data rate, and the like) may further indicate whether wireless device 302 is implementing carrier aggregation, and the threshold downlink number may be based on both the particular QCI or downlink data rate for wireless device 302 and the determination as to whether the wireless device is receiving carrier aggregated transmissions.

In an embodiment, the traffic metric may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. Embodiments that implement one or more listed traffic metrics may similarly implement a downlink threshold number corresponding to the implemented traffic metrics.

At step 508, the wireless device may be instructed to perform a handover from the source frequency band to the target frequency band when the signal level meets a signal level criteria and the second subframe configuration satisfies the traffic metric. For example, wireless device 302 may be instructed to perform a handover from the source frequency band to the target frequency band (e.g., used by one of access nodes 304, 306, or 308) when the received signal level for the signal received at wireless device 302 over the target frequency band meets a signal level criteria and when the second subframe configuration satisfies the traffic metric for wireless device 302.

In an embodiment, the received signal level for the signal received at wireless device 302 may meet the signal level criteria based on comparisons involving one or more a hysteresis, a threshold, and received signal level for other signals received at wireless device 302 (e.g., a received signal level over the source frequency band). For instance, based on an inequality comprising a plurality of these listed values, it may be determined that the received signal level over the target frequency band meets the signal level criteria.

In an embodiment, wireless device 302 may be instructed to perform an inter-access node handover or an intra-access node handover. For example, when the received signals corresponding to the source frequency band and the target frequency band are both transmitted by access node 304, wireless device 302 may be instructed to perform and intra-access node handover. When the received signals corresponding to the source frequency band and the target frequency band are transmitted by access node 304 and one of access nodes 306 and 308, respectively, wireless device 102 may be instructed to perform and inter-access node handover.

At step 510, the access node may refrain from instructing the wireless device to perform a handover from the source frequency band to the target frequency band when the signal level fails to meet a signal level criteria or the second subframe configuration fails to meet the traffic metric. For example, based on the comparisons described, access node 304 may refrain from instructing wireless device 302 to perform a handover from the source frequency band to the target frequency band when the signal level fails to meet a signal level criteria or the second subframe configuration fails to meet the traffic metric. In this example, based on the received signal level for the source frequency band at wireless device 302, access node 304 may adjust one or more transmissions to the wireless device. For example, when proximate access nodes (e.g., access nodes 306 and 308) and/or available frequency bands do not meet the traffic metric for wireless device 302, access node 304 may enable beamforming such that a beam formed signal is transmitted to the wireless device to mitigate against poor signal conditions and also meet the traffic metric of the wireless device.

Figure 6:
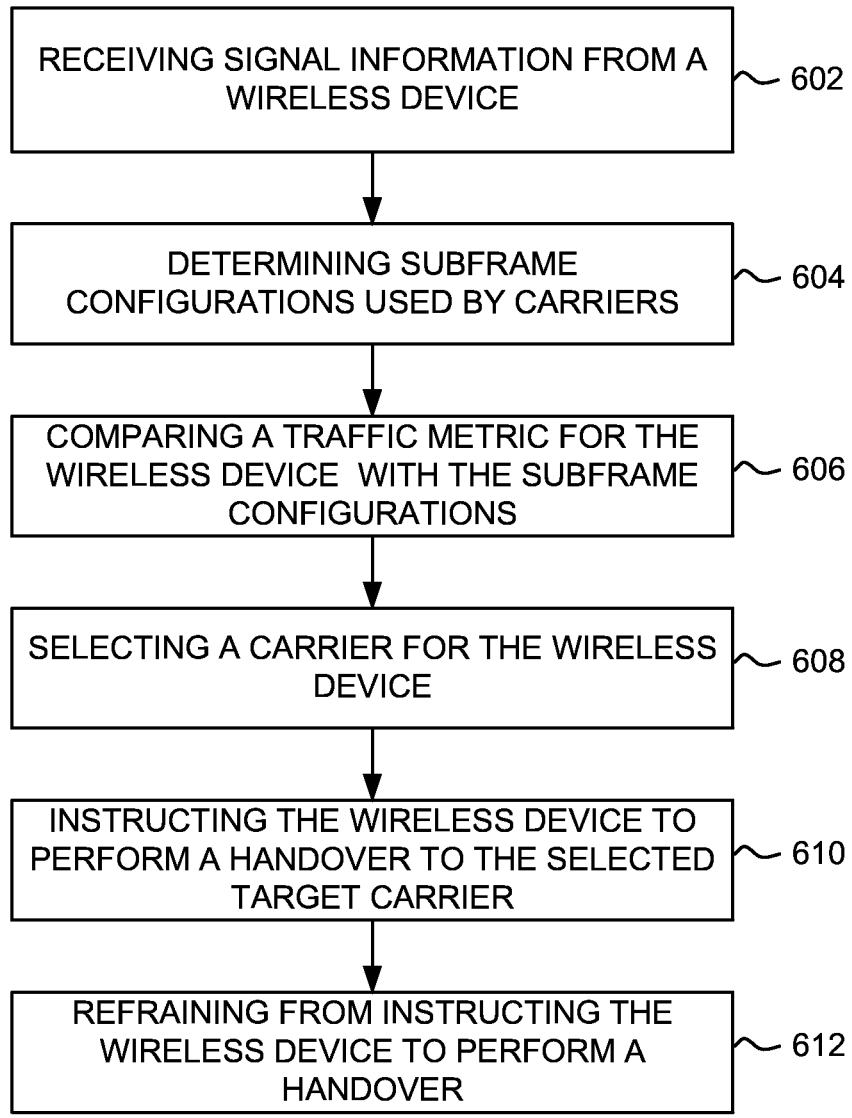
FIG. 6 illustrates another exemplary method for performing a handover based on target configuration.

FIG. 6 illustrates another exemplary method for performing a handover based on target configuration according to an embodiment. The method will be discussed with reference to the exemplary communication system 300 illustrated in FIG. 3, however, the method can be implemented with any suitable communication system.

Referring to FIG. 6, at step 602, signal information may be received from a wireless device at a first access node comprising a first signal level for a received signal at the wireless device for a source frequency band, a second signal level for a received signal at the wireless device for a first target frequency band, and a third signal level for a received signal at the wireless device for a second target frequency band, wherein the wireless device and the access node communicate over the source frequency band using a first subframe configuration. For example, access node 304 and wireless device 302 may communicate over a source frequency band using a first subframe configuration. For instance, communication between access node 304 and wireless device 302 may be coordinated according to the first subframe configuration that comprises a mix of uplink and downlink subframes.

In an embodiment, signal information may be received at access node 304 from wireless device 302 (e.g., in response to a reporting event being triggered as wireless device 302). The reporting event may comprise a LTE measurement reporting event that is triggered based on comparisons involving one or more received signal levels, one or more hysteresis, and/or one or more thresholds. Based on a triggered reporting event, a wireless device may transmit measurement reports comprising signal information to a serving access node.

In an embodiment, the signal information may comprise a received signal level for a signal received at wireless device 302 from access node 306 over a first target frequency band and access node 308 over a second frequency band. In other examples, the signal information may comprise received signal levels at wireless device 302 from access nodes 304, 306, and 308, where the received signals may be transmitted over one of more frequency bands. In an embodiment, the signal level may comprise a Received Signal Strength Indicator, (RSSI), Reference Signal Received Quality (RSRQ), RSRP, or any other suitable signal level.

At step 604, a second subframe configuration used over the target frequency band to communicate with wireless devices and a third subframe configuration used by the second target frequency band to communicate with wireless devices may be determined. For example, the second subframe configuration used to communicate over the first target frequency band and the third the subframe configuration used to communicate over the second target frequency band may be determined. In this example, the mix of uplink, downlink, and/or special subframes for the second subframe configuration and the third subframe configuration may be determined.

In an embodiment, access node 304 may receive second subframe configuration information and third subframe configuration information from each of access nodes 306 and 308. For example, over an X2 connection, the plurality of access nodes may share configuration information, such as subframe configurations for various frequency bands used for communication.

At step 606, a traffic metric for the wireless device may be compared to the first subframe configuration, second subframe configuration and the third subframe configuration. For example, a traffic metric, such as the QoS Class Identified (QCI), for wireless device 102 may be compared to the first subframe configuration, second subframe configuration, and third subframe configuration.

In an embodiment, comparing the traffic metric for wireless device 302 with a particular subframe configuration may comprise comparing a QCI for wireless device 302 with a number of downlink subframes for the particular subframe configuration. In this example, the particular subframe configuration may satisfy the QCI for wireless device 302 when a number of downlink subframes for the second subframe configuration meets a threshold downlink number. In an embodiment, the threshold downlink number may be associated with a particular QCI. For example, the QCI for wireless device 302 may comprise a value (e.g., between 1 and 9 for LTE implementations) and based on the QCI value, and the QoS requirements associated with the value, threshold numbers of downlink subframes may be associated with particular QCI values. Thus, a particular subframe configuration may satisfy the QCI for wireless device 302 when a number of downlink subframes for the particular subframe configuration is greater than (or equal to) a threshold downlink number associated with the particular QCI.

In another embodiment, comparing the traffic metric for wireless device 302 with a particular subframe configuration may comprise comparing a downlink data rate for wireless device 302 with a number of downlink subframes for the particular subframe configuration. In this example, the particular configuration may satisfy the downlink data rate for wireless device 302 when a number of downlink subframes for the particular subframe configuration meets a threshold downlink number. In an embodiment, the threshold downlink number may be associated with a particular downlink data rate, where the downlink data rate and threshold downlink number are directly related to one another. Thus, the particular subframe configuration may satisfy the downlink data rate for wireless device 302 when a number of downlink subframes for the particular subframe configuration is greater than (or equal to) a threshold downlink number associated with the particular downlink data rate.

In another embodiment, the traffic metric (e.g., QCI, downlink data rate, and the like) may further indicate whether wireless device 302 is implementing carrier aggregation, and the threshold downlink number may be based on both the particular QCI or downlink data rate for wireless device 302 and the determination as to whether the wireless device is receiving carrier aggregated transmissions.

In an embodiment, the traffic metric may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. Embodiments that implement one or more listed traffic metrics may similarly implement a downlink threshold number corresponding to the implemented traffic metrics.

At step 606, one of the source frequency band, the first target frequency band, and the second target frequency band may be selected for the wireless device based on the comparisons. In an embodiment, one of the source frequency band, the first target frequency band, and the second target frequency band for the wireless device may be selected, wherein the number of downlink subframes for the subframe configuration used by the selected frequency band meets the threshold number of downlink subframes and the signal level corresponding to the selected frequency band meets a signal level criteria In an embodiment, a received signal level for the signal received at wireless device 302 may meet the signal level criteria based on comparisons involving one or more a hysteresis, a threshold, and received signal level for other signals received at wireless device 302 (e.g., a received signal levels for signals over the source frequency band, first target frequency band, and second target frequency band). For instance, based on an inequality comprising a plurality of these listed values, it may be determined that the received signal level over the selected frequency band meets the signal level criteria.

In an embodiment, one of the source frequency band, the first target frequency band, and the second target frequency band for the wireless device may be selected, wherein the subframe configuration used by the selected frequency band comprises the greatest number of downlink subframes from among the subframe configurations for frequency bands that correspond to a signal level that meets the signal level criteria. For example, where the first target frequency band and second target frequency band each correspond to received signal levels that meet the signal level criteria, the selected frequency band may comprise the one that communicates with a subframe configuration that comprises the greatest number of downlink subframes.

In an embodiment, one of the source frequency band, the first target frequency band, and the second target frequency band for the wireless device may be selected, wherein the received signal level corresponding to the selected frequency band comprises the greatest signal level from among the signal levels for frequency bands that comprise a subframe configuration that meets the traffic metric. For example, where the first target frequency band and second target frequency band each communicate with subframe configurations that meet the traffic metric, the selected frequency band may comprise the frequency band that corresponds to the highest received signal level at wireless device 302 (e.g., according to the received signal information).

At step 610, the wireless device may be instructed to perform a handover from the source frequency band to the selected frequency band when the first target frequency band or second target frequency band is selected. For example, wireless device 302 may be instructed to perform a handover from the source frequency band to the selected frequency band (e.g., used by one of access nodes 306, or 308), when one of the first target frequency band or second target frequency band is selected. In this example, the handover may comprise an inter-access node handover.

At step 612, the access node may refrain from instructing the wireless device to perform a handover from the source frequency band to the target frequency band when the source frequency band is selected. For example, based on the comparisons described, access node 304 may refrain from instructing wireless device 302 to perform a handover from the source frequency band to one of the target frequency bands when the signals level for the target frequency bands fail to meet a signal level criteria or the subframe configurations for the target frequency bands fail to meet the traffic metric. In this example, based on the received signal level for the source frequency band at wireless device 302, access node 304 may adjust one or more transmissions to the wireless device. For example, when proximate access nodes (e.g., access nodes 306 and 308) and/or available frequency bands do not meet the traffic metric for wireless device 302 or do not meet signal condition requirements for handover, access node 304 may enable beamforming such that a beam formed signal is transmitted to the wireless device to mitigate against poor signal conditions and also meet the traffic metric for wireless device.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 8:
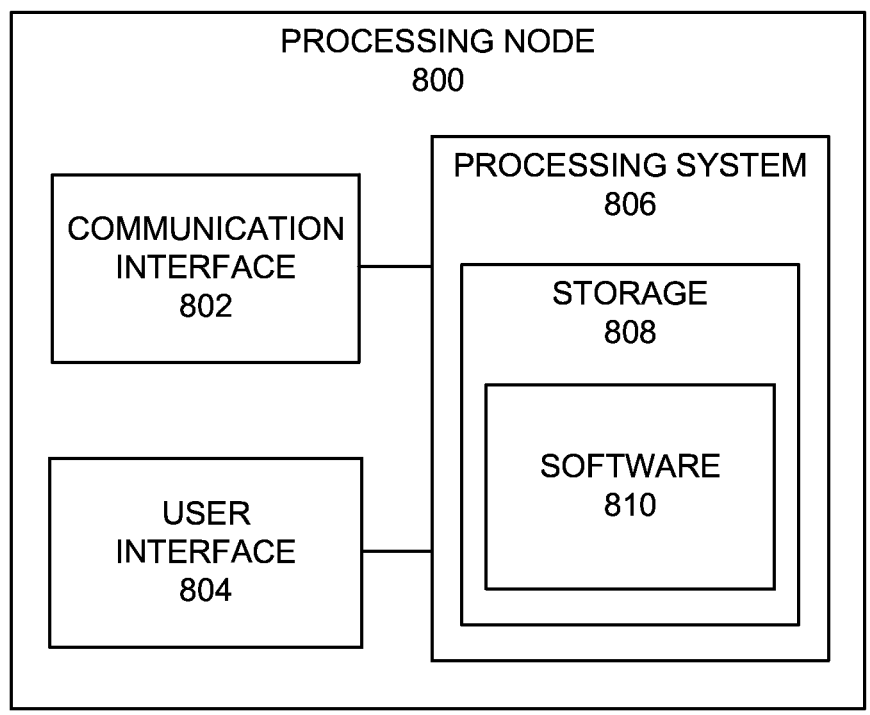
FIG. 8 illustrates an exemplary processing node.

FIG. 8 illustrates an exemplary processing node 800 in a communication system. Processing node 800 comprises communication interface 802, user interface 804, and processing system 806 in communication with communication interface 802 and user interface 804. Processing node 800 can be configured to determine a communication access node for a wireless device. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include controller node 310 and gateway node 312. Processing node 800 can also be an adjunct or component of a network element, such as an element of access nodes 104 or 304 and the like. Processing node 800 can also be another network element in a communication system. Further, the functionality of processing node 800 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for performing a handover, the method comprising:
receiving, from a wireless device at a first access node, signal information comprising a signal level for a received signal at the wireless device for a target frequency band, wherein the wireless device and the access node communicate over a source frequency band using a first subframe configuration;
determining, at the first access node, a second subframe configuration used by the target frequency band to communicate with wireless devices;
comparing, at the first access node, the first subframe configuration and the second subframe configuration; and
instructing, by the first access node, when the signal level meets a signal level criteria, the wireless device to perform a handover from the source frequency band to the target frequency band based on the comparison.

2. A method of claim 1, further comprising instructing the wireless device to perform a handover from the source frequency band to the target frequency band when the first subframe configuration matches the second subframe configuration based on the comparison.

3. A method of claim 2, wherein the first subframe configuration matches the second subframe configuration when they comprise the same order of subframes.

4. A method of claim 1, wherein comparing the first subframe configuration and the second subframe configuration further comprises determining whether the first subframe configuration and second subframe configuration are part of a group of similar subframe configurations, wherein similar subframe configurations are grouped based on a number of downlink subframes within each subframe configuration.

5. A method of claim 4, further comprising instructing, when the signal level meets the signal level criteria, the wireless device to perform a handover from the source frequency band to the target frequency band when the first subframe configuration and second subframe configuration are determined to be part of a group of similar subframe configurations.

6. A method for performing a handover, the method comprising:
receiving, from a wireless device at a first access node, signal information comprising a signal level for a received signal at the wireless device for a target frequency band, wherein the wireless device and the access node communicate over a source frequency band using a first subframe configuration;
determining, at the first access node, a second subframe configuration used by the target frequency band to communicate with wireless devices;
comparing, at the first access node, a traffic metric for the wireless device with the second subframe configuration; and instructing, by the first access node, the wireless device to perform a handover from the source frequency band to the target frequency band when the signal level meets a signal level criteria and the second subframe configuration satisfies the traffic metric.

7. A method of claim 6, wherein comparing the traffic metric for the wireless device with the second subframe configuration further comprises comparing a traffic metric comprising a quality of service class identifier (QCI) for the wireless device with a number of downlink subframes for the second subframe configuration.

8. A method of claim 7, wherein the second subframe configuration satisfies the QCI for the wireless device when the number of downlink subframes for the second subframe configuration meets a threshold number corresponding to the QCI for the wireless device.

9. A method of claim 6, wherein comparing the traffic metric for the wireless device with the second subframe configuration further comprises comparing the traffic metric comprising a downlink data rate for the wireless device with a number of downlink subframes for the second subframe configuration.

10. A method of claim 9, wherein the second subframe configuration satisfies the downlink data rate for the wireless device when the number of downlink subframes for the second subframe configuration meets a threshold number corresponding to the downlink data rate for the wireless device.

11. A method of claim 6, wherein the second subframe configuration satisfies the traffic metric for the wireless device when the number of downlink subframes for the second subframe configuration meets a threshold number corresponding to the traffic metric for the wireless device and is greater than a number of downlink subframes for the first subframe configuration.

12. A method of claim 6, wherein either the first access node or a second access node uses the target frequency band to communicate with wireless devices.

13. A method of claim 12, wherein the second access node uses the target frequency band to communicate with wireless devices and the first access node and the second access node communicate subframe configuration information across an X2 communication link.

14. A method of claim 6, wherein the signal level comprises one of a received signal strength indicator (RSSI), reference signal received power (RSRP), or reference signal received quality (RSRQ).

15. A method for performing a handover, the method comprising:
receiving, from a wireless device at a first access node, signal information comprising a first signal level for a received signal at the wireless device for a source frequency band, a second signal level for a received signal at the wireless device for a first target frequency band, and a third signal level for a received signal at the wireless device for a second target frequency band, wherein the wireless device and the access node communicate over the source frequency band using a first subframe configuration;

determining, at the first access node, a second subframe configuration used by the first target frequency band to communicate with wireless devices and a third subframe configuration used by the second target frequency band to communicate with wireless devices;
comparing, at the first access node, a traffic metric for the wireless device with the first subframe configuration, the second subframe configuration, and the third subframe configuration;
selecting, at the first access node, one of the source frequency band, the first target frequency band, and the second target frequency band for the wireless device based on the comparison; and
instructing, by the first access node, the wireless device to perform a handover from the source frequency band to the selected frequency band when the first target frequency band or second target frequency band is selected.

16. A method of claim 15, further comprising:
comparing a number of downlink subframes for the first subframe configuration, second subframe configuration and third subframe configuration with a threshold number of downlink subframes corresponding to the traffic metric for the wireless device; and
selecting one of the source frequency band, the first target frequency band, and the second target frequency band for the wireless device, wherein the number of downlink subframes for the subframe configuration used by the selected frequency band meets the threshold number of downlink subframes and the signal level corresponding to the selected frequency band meets a signal level criteria.

17. A method of claim 15, further comprising:
determining which of the first signal level, the second signal level, and the third signal level meet a signal level criteria; and
selecting one of the source frequency band, the first target frequency band, and the second target frequency band for the wireless device, wherein the subframe configuration used by the selected frequency band comprises the greatest number of downlink subframes from among the subframe configurations for frequency bands that correspond to a signal level that meets the signal level metric.

18. A method of claim 15, wherein the traffic metric comprises a quality of service class identifier (QCI) or downlink data rate for the wireless device.

19. A method of claim 15, wherein a second access node uses one of the first target frequency band or the second target frequency band to communicate with wireless devices and the first access node and the second access node communicate subframe configuration information across an X2 communication link.

20. A method of claim 15, wherein the first signal level, second signal level, and third signal level comprise one of a received signal strength indicator (RSSI), reference signal received power (RSRP), or reference signal received quality (RSRQ).

* * * * *

UNITED STATES PATENT AND TRADEMARK OFFICE
CERTIFICATE OF CORRECTION

PATENT NO. : 9,820,201 B1
APPLICATION NO. : 14/939224
DATED : November 14, 2017
INVENTOR(S) : Siddharth Oroskar and Jasinder P. Singh Page 1 of 1

It is certified that error appears in the above-identified patent and that said Letters Patent is hereby corrected as shown below:

On the Title Page

At item (73) Assignee:
Please delete "Sprint Communications Company L.P." and replace it with --Sprint Spectrum L.P.--

Signed and Sealed this
Twelfth Day of December, 2017

Joseph Matal
*Performing the Functions and Duties of the
Under Secretary of Commerce for Intellectual Property and
Director of the United States Patent and Trademark Office*